W. JAMESON.
APPARATUS FOR MAKING STRAND FABRIC.
APPLICATION FILED DEC. 28, 1918.
1,327,826.
Patented Jan. 13, 1920.
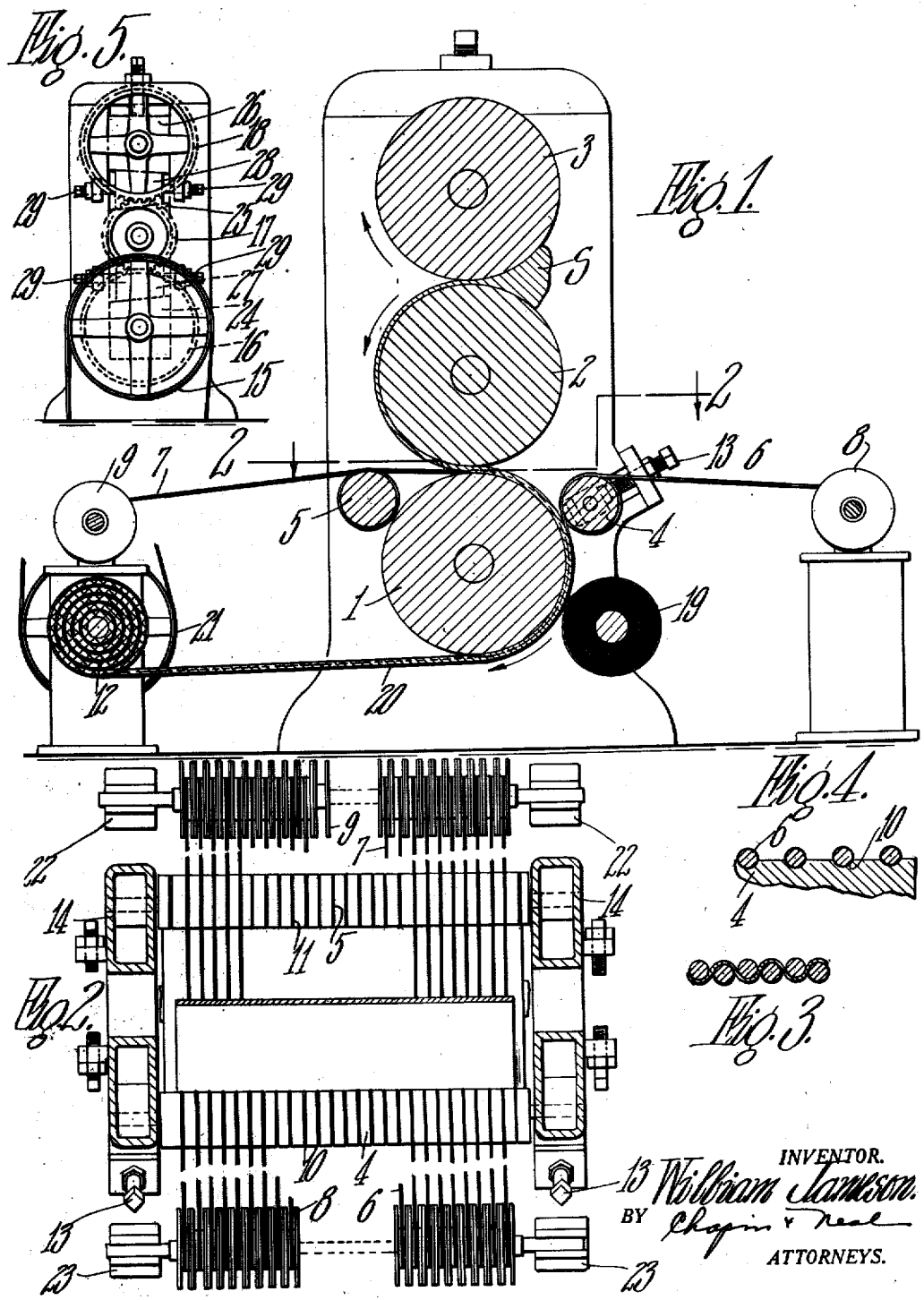

UNITED STATES PATENT OFFICE.

WILLIAM JAMESON, OF SPRINGFIELD, MASSACHUSETTS, ASSIGNOR TO THE FISKE RUBBER COMPANY, OF CHICOPEE FALLS, MASSACHUSETTS, A CORPORATION OF MASSACHUSETTS.

APPARATUS FOR MAKING STRAND FABRIC.

1,327,826.     Specification of Letters Patent.     Patented Jan. 13, 1920.

Application filed December 28, 1918. Serial No. 268,633.

*To all whom it may concern:*

Be it known that I, WILLIAM JAMESON, a citizen of the United States of America, residing at Springfield, in the county of Hampden and State of Massachusetts, have invented certain new and useful Improvements in Apparatus for Making Strand Fabric, of which the following is the specification.

My invention relates to the manufacture of rubber sheets with strands embedded therein, and more particularly to apparatus for making strand fabric.

In the making of pneumatic tire casings, commonly called "tires" there is frequently used material comprising a sheet of tacky unvulcanized rubber with parallel strands, generally in the character of cords, embedded therein, the rubber holding the strands together to form a sheet of what may be termed "strand fabric." I have devised an apparatus for the manufacture of such material, and material of similar character.

One object of my invention is to provide an apparatus of the character indicated by which sheets with strands embedded therein may be produced rapidly and inexpensively.

Another object is to provide an apparatus for the manufacture of material of the character indicated, in which material successive strands are embedded in opposite sides of the sheet.

To these ends, and also to improve generally upon devices of the character indicated, my invention consists in the following matters hereinafter described and claimed.

Without restricting my invention thereto, I describe it by reference to the apparatus illustrated in the accompanying drawings; and in these drawings—

Figure 1 is a central elevational section of an apparatus embodying my invention, the strand suppliers not, however, being shown in section, but merely in side elevation; and the depths of the strand-grooves in the pressing roller being exaggerated as compared to Fig. 4, and the strands, as fed by such roller, upstanding from the sheet, as compared to Fig. 3, the clearer to illustrate the invention.

Fig. 2 is a section substantially on the line 2—2 of Fig. 1, with the strands broken out, and reels (with the major portions of their supports omitted) moved toward the calendar machine, to save space, and the driving means, the adjustable mounting for the rolls, liner drum, and the drum for the product, all being omitted to avoid confusion;

Fig. 3 is an enlarged cross-section of the fabric produced by the illustrated apparatus when the parts are arranged for maximum embedment;

Fig. 4 is a fragmental view of a grooved roller and a few of the strands; and

Fig. 5 is a side elevation showing the mounting of the calendar rolls.

In general, the illustrated apparatus comprises three superposed calendar rolls 1, 2, and 3, these rolls being positively driven, at such relative surface speeds as desired. Arranged, each at a respective side of the lower roll 1, are strand-guiding means exemplified by rotatable elements, or rollers, 4 and 5, each arranged to receive a series of strands, generally cords, as 6 and 7 from supply means, as the series of spools 8 and 9. Each of these rollers is provided on its surface with a series of strand-guiding grooves, as 10 and 11, and the grooves of one roller are staggered with respect to those of the other.

In operation: the stock S of unvulcanized rubber is fed between the rolls 2 and 3 and calendered into a sheet. This sheet is then carried, by the roll 2, between the rolls 1 and 2, and then wound upon the drum 12. The strands 7 are fed to the lower side of the sheet to lie between the sheet and the surface of the roll 1. Here they are embedded in the sheet by the pressure between rolls 1 and 2, the exact amount of the embedment depending upon the amount of the pressure, which may be regulated by any suitable adjusting means, as hereinafter described. Preferably, and also as hereinafter described, there are provided means for adjusting the pressure between the rolls 2 and 3 to regulate the thickness of the sheet. The strands 6 are led to the upper surface of the sheet and embedded therein to the extent desired. With the drum 12, roll 1 and roller 4 in relative positions substantially as shown, a certain embedment of the strands 6 will of course occur. But, preferably, and as shown, the roller 4 is arranged to directly coöperate with the roll 1 to press the stock and strands 6 therebetween, and so embed the strands 6. Again, the roller 4, coöperating with the roll 1 acts to supplement the embedding action of the rolls 1 and 2 on the strands 7. The amount of the pressure between the rolls 1 and 4 may be regulated in any desired manner, as by mounting the roller 4 with an adjustable-journal-block construction 13, for adjustment to and from the roll 1, for each journal.

It will be seen that the illustrated apparatus provides means for embedding strands in rubber in staggered relation, for adjusting the thickness of the sheet, and for adjusting the amount of embedment of either or both series of strands.

Although I have exemplified the guiding means for the strands by the grooved rollers 4 and 5, rather than by reeds or the like, it will be understood that I do not restrict my invention to the use of grooved rollers as a guiding means.

It will also be understood that when it is desired that the roller 4 shall act, not only as a pressure roll to press the rubber about the strands 7, but also as a means for pressing the strands 6 into the sheet, the grooves 10 are desirably, and as illustrated (Fig. 4) of any desired less depth than the diameter of the strands.

As to details: The machine comprises the upright frame members 14, 14, in which are rotatably mounted the rolls 1, 2, and 3, the roll 1 being driven by the pulley 15 and the rolls 2 and 3 receiving motion from the roll 1 through the gears 16, 17, and 18. The frame members also rotatably support the rollers 4 and 5 and the drum 19 for the supply of "liner" 20 to lie between the layers of the finished fabric wound upon the drum 12. The drum 12 may be driven at decreasing speed as the diameter of the fabric increases, in any suitable manner, as by the pulley 21. The standards 22, 22, and 23, 23 at each side of the roller-carrying frames 14, 14 rotatably support the spools 8 and 9.

As indicated in Fig. 5, the means for moving the rolls 1 and 2 relatively toward and from each other, and the means for similarly relatively moving the rolls 2 and 3, may comprise a system of adjustable journal blocks (duplicated at each side of the machine) for carrying the rolls 1, 2, and 3. The block 24, carrying the roll 1, the block 25, carrying the roll 2, and the block 26, carrying the roll 3, are vertically slidably mounted in the frame 14. Between the blocks 24 and 25 and between the blocks 25 and 26 is inserted a vertically-slidable and sidewise-adjustable wedge block 27 or 28, each with its upper and lower surfaces inclined toward each other. The blocks 24, 25 and 26 have their surfaces in contact with the blocks 27 and 28 inclined coöperatively with the surfaces of the blocks 27 and 28. These latter blocks can be adjusted sidewise by screws 29. By moving the block 27 to the right (Fig. 5) the distance between the rolls 1 and 2 will be increased and vice versa, and similarly with the block 28 and rolls 2 and 3. Different diameter gears, to compensate for the difference in distance between the rolls may of course, be substituted as desired. Also the surface speeds of the rolls may be determined as desired. As illustrated, roll 2 has a higher surface speed than roll 3, thereby to refine the stock, and also has a higher surface speed than roll 1, thereby to work the stock somewhat into the strands. But, any other feasible speed relation, as equal speeds, may be resorted to by merely changing the gears, as will be understood.

It will be seen that I have provided an apparatus for the production of sheets with strands embedded therein, and more particularly for the production of cord fabric with a set of cords embedded in each face, with the cords of one set staggered with respect to those of the other set, and with which production can be carried on expeditiously and satisfactorily.

Having thus described my invention, what I claim as new, and desire to secure by Letters Patent is:—

1. In an apparatus of the character indicated, in combination, a series of coöperating rolls, certain of said rolls being arranged to produce a sheet and certain of said rolls being arranged to receive and pass said sheet therebetween, means to feed a series of strands between one of said latter named rolls and said sheet, means to feed a second series of strands to the other side of said sheet in staggered relation to the first named strands, and means to vary the pressure between said sheet-producing rolls; substantially as described.

2. In an apparatus of the character indicated, in combination, a pair of coöperating pressure rolls arranged to receive a sheet of material therebetween, means to feed a series of strands between one of said rolls and one side of said sheet and means coöperating with such roll to press a second series of strands into the other side of said sheet in staggered relation to the first named strands; substantially as described.

3. In an apparatus of the character indicated, in combination, a pair of coöperating pressure rolls arranged to receive a sheet of material therebetween, means to feed a series of strands between one of said rolls and one side of said sheet, means coöperating with such roll to press a second series of strands into the other side of said sheet in staggered relation to the first named strands, and means for varying the pressure exerted by said last named means; substantially as described.

4. In an apparatus of the character indicated, in combination, three contiguous and coacting pressure rolls, one contiguous pair of said rolls being adapted to roll stock into sheet form and the other contiguous pair being adapted to press the so-formed sheet therebetween, means to feed a series of strands between said second named pair of rolls and to one side of said sheet, and a roller arranged to feed another series of strands to the other side of said sheet, said roller being arranged in coöperative pressing relation to a roll of said second named pair to feed said second series of strands to said sheet with the strands of such series in staggered relation to the strands of the first said series; substantially as described.

WILLIAM JAMESON.